United States Patent [19]
Doll

[11] Patent Number: 6,148,862
[45] Date of Patent: Nov. 21, 2000

[54] SOLENOID VALVE COIL PACK

[75] Inventor: Robert A. Doll, Glendale, Wis.

[73] Assignee: Applied Power Inc., Waukesha, Wis.

[21] Appl. No.: 09/261,020

[22] Filed: Mar. 2, 1999

Related U.S. Application Data

[60] Provisional application No. 60/079,549, Mar. 27, 1998.

[51] Int. Cl.[7] ............................ F16K 31/02; F15B 13/044
[52] U.S. Cl. ........................... 137/884; 137/560; 137/271
[58] Field of Search ..................................... 137/884, 271, 137/625.64, 269, 560

[56] References Cited

U.S. PATENT DOCUMENTS

| | | | |
|---|---|---|---|
| 4,893,652 | 1/1990 | Nogle et al. | 137/625.65 |
| 5,437,306 | 8/1995 | Asou et al. | 137/625.64 |
| 5,845,679 | 12/1998 | Hayashi et al. | 137/884 X |
| 5,915,666 | 6/1999 | Hayashi et al. | 137/884 X |
| 5,944,056 | 8/1999 | Miyazoe et al. | 137/884 X |

*Primary Examiner*—Kevin Lee
*Attorney, Agent, or Firm*—Quarles & Brady LLP

[57] ABSTRACT

A valve bank has a coil pack assembly with multiple solenoid coils bound to one another by a single resin body. An L-shaped magnetic (but not magnetized) bracket is also bound within the body and extends between upper pole pieces of the valves and the manifold in which the valves are mounted. A retainer plate holds the valves in the manifold, and helps complete the magnetic flux path circuit from the manifold end of the bracket to the lower pole pieces of the valves. A spring clip helps position the manifold end of the bracket close to the retainer plate. A circuit board for individually energizing the coils is also potted within the resin body.

11 Claims, 11 Drawing Sheets

SOLENOID VALVE COIL PACK

CROSS-REFERENCE TO RELATED APPLICATIONS

This claims the benefit of U.S. Provisional Patent Application No. 60/079,549 filed Mar. 27, 1998.

STATEMENT REGARDING GOVERNMENT SPONSORED RESEARCH OR DEVELOPMENT

Not applicable.

FIELD OF THE INVENTION

This invention relates to a solenoid valve coil pack, and in particular to a solenoid valve coil pack for a hydraulic vehicle suspension system.

BACKGROUND OF THE INVENTION

U.S. Pat. No. 5,601,307 discloses a vehicle suspension system in which a double-acting hydraulic ram supports the vehicle at each wheel with the ram chambers at opposite diagonal corners of the vehicle cross-connected so as to provide four discrete hydraulic wheel circuits. A load distribution unit is connected to the four hydraulic circuits for hydraulically equalizing the pressures in the circuits. FIG. 5 of U.S. Pat. No. 5,601,307 discloses a load distribution unit (LDU) 140 which includes a pair of cylinders, each containing a double-acting ram that divides the cylinder which contains it into four variable volume chambers, one chamber at each end of the ram and two chambers inward of the two end chambers, each chamber being isolated from all the others. Each of the inward chambers communicates with a different one of the wheel circuits, with each LDU cylinder being connected to the same chambers of the wheel cylinders on opposite sides of the vehicle, i.e. one of the inward chambers of one of the LDU cylinders is connected to the wheel cylinder circuit that connects the front left upper wheel cylinder with the rear right lower wheel cylinder, and the other inward chamber of the same LDU cylinder is connected to the wheel circuit that connects the front right upper wheel cylinder with the rear left lower wheel cylinder. In the same manner, the other LDU cylinder is connected to the two wheel circuits that connect the front lower wheel cylinders with the rear upper wheel cylinders. A total of six (one for each of the four inward chambers, plus one for each of the two end chambers of different LDU cylinders that are connected) solenoid-operated pressure supply valves 204 are supplied for providing hydraulic fluid under pressure to the various chambers of the LDU, and a total of six pressure relief or drain valves 215 are provided for relieving pressure from the various chambers. In addition, a reservoir 66 is provided for the hydraulic fluid, together with a pump 65 and gas-charged accumulators 202 for maintaining pressure in the system.

Such a vehicle suspension system requires several solenoid operated hydraulic valves. The coils must be small, highly reliable, pull-in with relatively high forces at vehicle voltages (typically 12 VDC), and maintain actuation with high dynamic forces, exerted not only by the fluid, but also by the movement of the vehicle. The present invention provides a valve coil pack which contributes to the solution of these problems.

SUMMARY OF THE INVENTION

An LDU incorporating a coil pack of the invention has a valve bank which includes multiple valves, each with a separate solenoid coil of the coil pack. The coil pack, in addition to holding the coils in proper relation to one another so that they can be simultaneously installed over the valve bodies of the valves in the valve bank, includes an L-shaped bracket, common to all of the coils, of a magnetic (although not necessarily magnetized) material, such as steel, which is an integral part of the coil pack assembly. The bracket provides a magnetic flux path between the opposite poles of the valve which increases the magnetic force exerted by the coils on their respective valves. It performs this function particularly well when more than one coil is energized at the same time, especially when the energized coils are adjacent or close to one another.

In a preferred form, the top of the L-shaped bracket has a hole in it for each valve body, into which the top of the upper pole piece of the corresponding valve body is received. The holes establish a relatively large annular area between the inner diameter of the hole and the outer diameter of the valve body for the conduction of magnetic flux. An optional nut may also be provided to make metal to metal contact between the upper pole piece and the bracket.

The valve bodies are received in one or more manifolds of the LDU and held therein by a retainer plate, also of a magnetic material, which is fixed to the manifold. The bottom of the L-shaped bracket intimately contacts the retainer plate, to complete the part of the magnetic circuit between the upper pole piece and the retainer plate. In this aspect, a clip may be used on the side of the valves opposite from the bracket to push the body so as to bring the side of the bracket into intimate contact with the side of the retainer plate. The retainer plate contacts the side of the lower pole pieces, which extend through the plate thereby creating an annular flux path, to complete the magnetic circuit.

In another aspect, the body which binds together the coils and the bracket also binds electrical circuitry for energizing each coil individually. The body is preferably a solid resin mass which fills the voids between the components of the coil pack, to create a rigid and durable structure.

These and other objects and advantages of the invention will become apparent from the detailed description and drawings.

DETAILED DESCRIPTION OF THE PREFERRED EMBODIMENT

Figure 1:
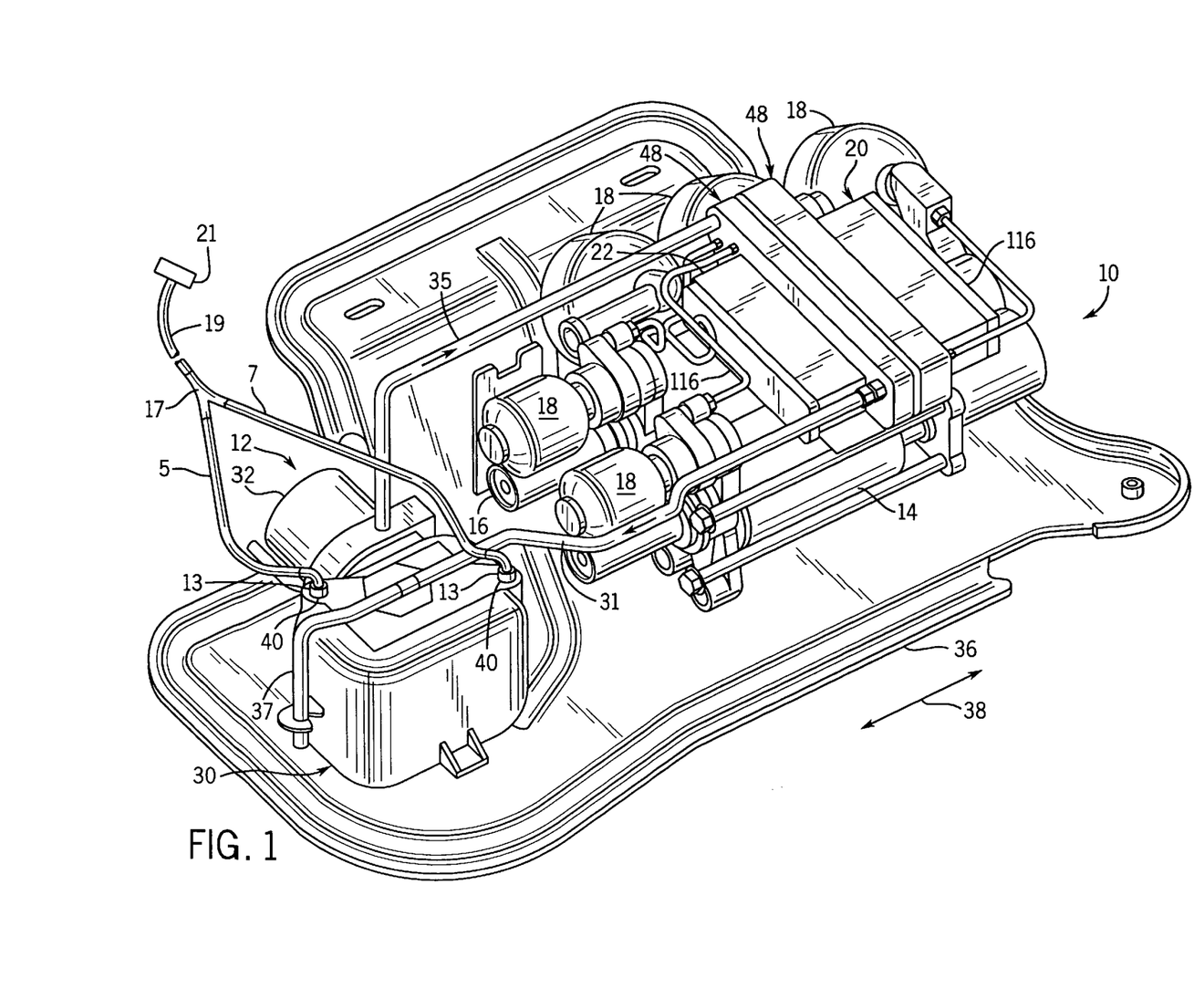
FIG. 1 is a perspective view of an LDU, pump and reservoir for a hydro pneumatic vehicle suspension system.

FIG. 1 illustrates an LDU 10 and power unit 12 which may be used in a vehicle suspension system of the type described in U.S. Pat. No. 5,601,307, the disclosure of which is hereby incorporated by reference. The LDU 10 includes a pair of cylinders 14 and 16, a number of accumulators 18, a relief valve bank 20 and a pressure supply valve bank 22. The power unit 12 includes a reservoir 30 and a motor/pump unit 32. The LDU 10 and power unit 12 are mounted on a skid plate 36 which is bolted to the bottom of the chassis of the vehicle, for example, outside of the passenger compartment under the driver's seat area of the vehicle, so that the fore-aft direction is represented by the arrow 38 in FIG. 1.

Although the LDU 10 and power unit 12 are described as being usable with the vehicle suspension system described in FIG. 5 of U.S. Pat. No. 5,601,307, it should be understood that the LDU 10 and power unit 12 could be used with any hydro-pneumatic vehicle suspension system, not just the one described in FIG. 5 of U.S. Pat. No. 5,601,307. If the LDU 10 is used with the circuit of FIG. 5 of U.S. Pat. No. 5,601,307, one of the larger accumulators 18 may be used for one of the sets of end chambers, i.e., the two end chambers of the two LDU cylinders 14 and 16 at one end of the cylinders, a different one of the larger accumulators 18 may be used for the set of end chambers at the other end of the LDU cylinders 14, 16, and the remaining larger accumulator 18 may be used as the pump charge accumulator 202 illustrated closest to the pump 65 in FIG. 5 of U.S. Pat. No. 5,601,307. The two smaller accumulators 18 at the rearward end of the LDU 10 may each be applied as the accumulator for one of the wheel cylinders of the suspension system; for example, one of the smaller accumulators 18 would be the accumulator for one of the rear wheel cylinders, and the other accumulator 18 would be the accumulator for the other rear wheel cylinder. This may be desirable, for example, if there is not room in the rear wheel wells to provide the accumulators at that location. For the front wheel cylinders, which typically would have adequate room in the wheel wells for the accumulators, an accumulator is attached to or provided as part of each respective cylinder, as described for example in U.S. patent application Ser. No. 60/061,773 filed Oct. 10, 1997, the disclosure of which is hereby incorporated by reference.

The purpose of the reservoir 30 is to contain in reserve a supply of hydraulic fluid to be provided under pressure by the motor/pump 32 to whichever of the six pressure valves in the pressure valve bank 22 calls for it, and to receive hydraulic fluid from whichever of the six valves in the drain valve bank 20 opens to permit fluid to flow to the reservoir 30. Pressure line 35 connects the pump outlet with the LDU inlet. The valves in the valve banks 20 and 22 are operated in response to signals from an electronic control unit (e.g., ECU 68 in FIG. 5 of U.S. Pat. No. 5,601,307) to supply hydraulic fluid to or remove hydraulic fluid from the various subcircuits of the vehicle suspension system, to maintain the vehicle level or to change the elevation of the vehicle relative to the wheels.

Figure 3:
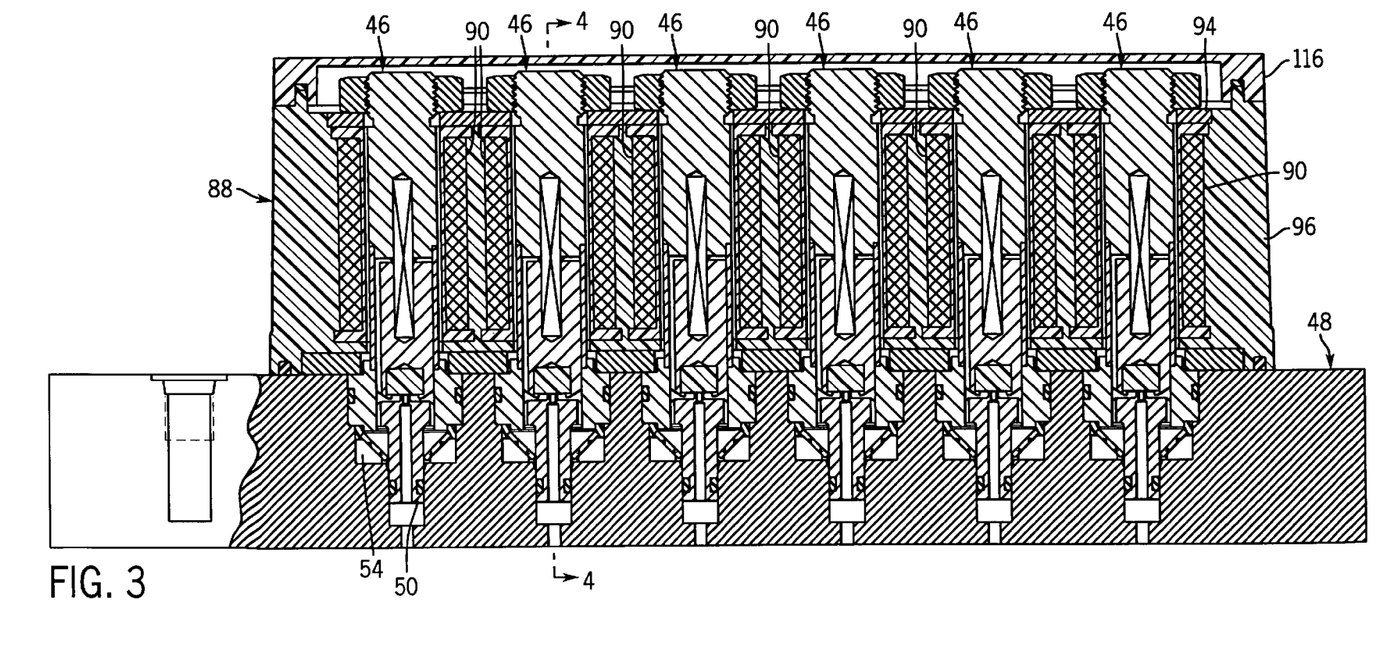
FIG. 3 is a cross-sectional view through an alternate embodiment of a valve bank for the LDU illustrated in FIG. 1.
Figure 4:
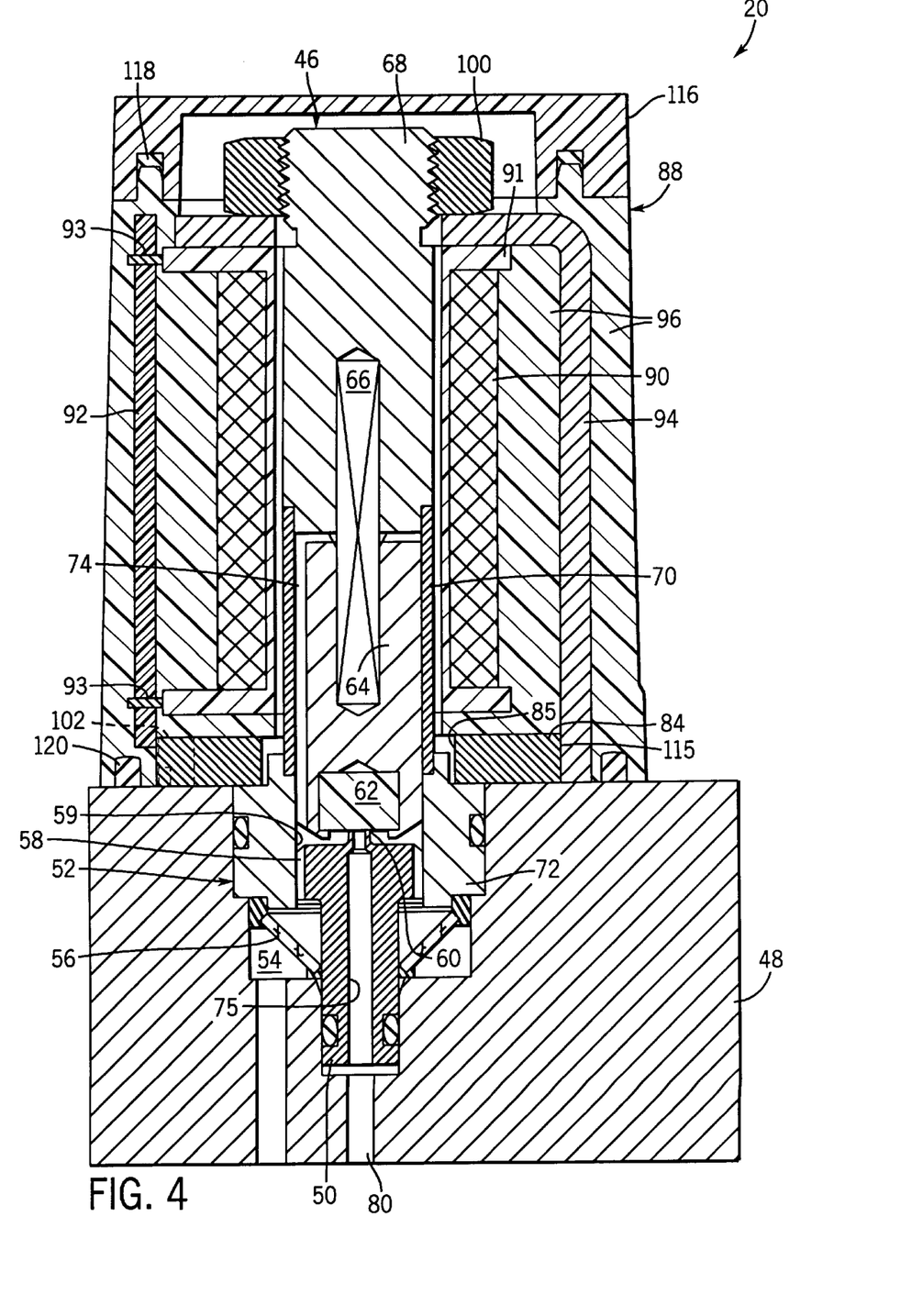
FIG. 4 is a cross-sectional view along the plane of the line 4—4 of FIG. 3.

The banks 20 and 22 each contain six valves, the relief bank 20 containing valves for connecting the various hydraulic subcircuits of the suspension system with the reservoir 30, and the supply bank 22 containing six valves for connecting the various subcircuits of the vehicle suspension system with the output of the motor/pump unit 32. Referring to FIGS. 3 and 4, sectional views of the relief valve bank 20 are shown. It should be understood that a sectional view of the supply valve bank 22 would be essentially the same as FIGS. 3 and 4. The valve bank 22 will not be described in detail, since the following detailed description of the valve bank 20 applies to the valve bank 22 as well.

As illustrated in FIG. 3, the valve bank 20 contains six valves 46, each of which is identical to the others. The six valves 46 are all inserted into six correspondingly-shaped bores in a manifold block 48. Seals are provided between each brass valve nipple 50 and steel valve body 52 and the manifold 48 to define a fluid inlet chamber 54, which defines the pressure side of the valve. In the relief valve bank, each chamber 54 is in communication with one of the subcircuits from which pressure is to be relieved. In the pressure valve bank 22, each chamber 54 is in communication with the pressure output of the motor/pump unit 32. Thus, each valve 46 is normally a unidirectional valve, although reverse flow is possible as further described below in connection with a back-pressure blow-off condition.

A filter 56 is provided around the brass nipple 50, which is in sealing engagement with the end of the body 52 at one end and with the manifold 48 at the other end, so that fluid admitted to the valve 46 must first pass through the filter. After passing through the filter 56, fluid can flow through longitudinally-running slots 58 (only one shown, but several would be provided) formed in the outside of the larger diameter portion of the nipple 50, between the nipple 50 and the main bore 59 of the body 52. The slots 58 therefore communicate the fluid from the chamber 54 to the area of the valve seat 60.

The valve seat 60 is formed on the end of a nozzle and is normally closed by a plastic (e.g., Delrin 530) insert 62 which is crimped in and held by the steel armature 64. The insert 62 is biased against the seat 60 so as to normally close it by spring 66, which is a compression spring that extends between the armature 64 and a steel pole piece 68. Steel sleeve 70 is welded at its lower end to the lower end pole piece 72 of the valve body 52 and is welded at its upper end to the pole piece 68, so as to make the main bore 59 fluid-tight, so that only flow path into or out of the main bore 59 is past the nipple 50. Slot 74 is formed longitudinally in the outside of the armature 64 to communicate fluid to the top side of the armature 64 and into the spring chambers of the armature 64 and pole piece 68 so that the armature 64 is pressure-balanced, except to the extent that it is pressure-biased against the seat 60 since the effective area on which pressure acts on the armature 64 is reduced by the area of the valve seat 60 at the lower end of the armature 64. Therefore, pressure on the top side of the armature 64 acts on the equivalent of the area of the valve seat 60 to bias the armature 64 against the valve seat 60, also aided by the spring 66.

Pressure within the axially longitudinally-running passageway 75 within the nipple 50 acts against the bottom of the insert 62 to tend to open, or "blow off" the armature 64. Thus, although the valves 46 are intended to primarily and normally permit flows from chamber 54 to passageway 80, flows in the opposite direction, from passageway 80 to chamber 54, are possible in case the pressure in passageway 80 exceeds the pressure in chamber 54 by an amount sufficient to overcome the spring 66 and the pressure differential force tending to bias the armature 64 into the sealed position. The valves 46 are further described in U.S. patent application Ser. No. 60/114,902 filed Jan. 5, 1999, the disclosure of which is hereby incorporated by reference.

Figure 5:
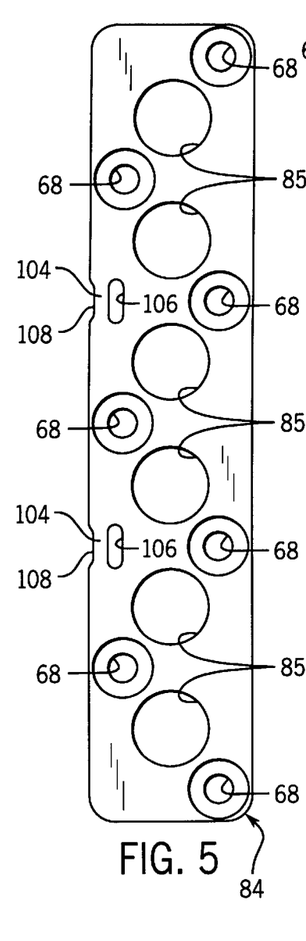
FIG. 5 is a top plan view of a retaining plate for either valve bank assembly.
Figure 6:
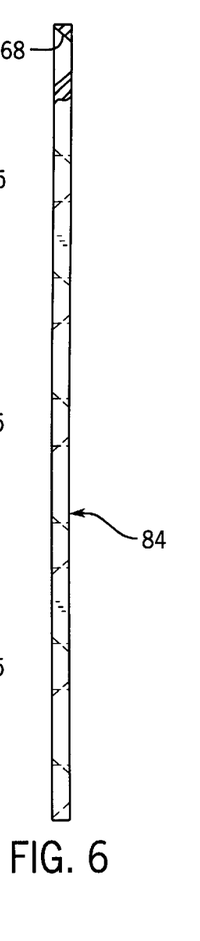
FIG. 6 is a side plan view of the retaining plate of FIG. 5.
Figure 7:
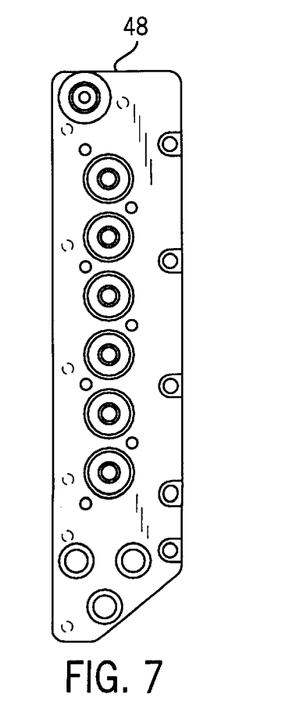
FIG. 7 is a top plan view of the manifold illustrated in FIGS. 3 and 4.
Figure 8:
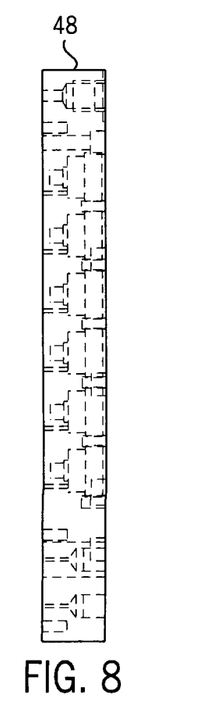
FIG. 8 is a side plan view of the manifold illustrated in FIG. 7.
Figure 9:
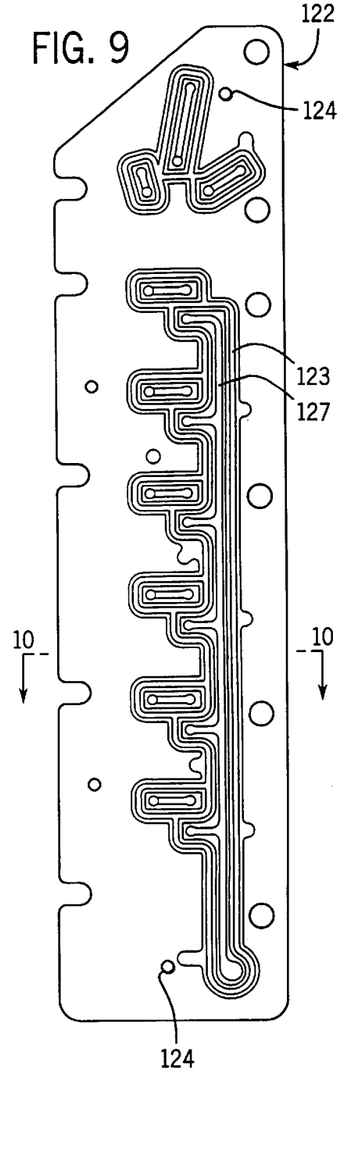
FIG. 9 is a top plan view of a gasket which goes between the pressure and relief manifolds.
Figure 10:
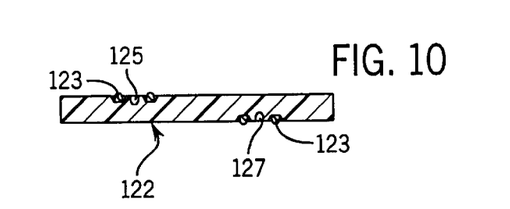
FIG. 10 is a cross-sectional view along the plane of the line 10—10 of FIG. 9.
Figure 11:
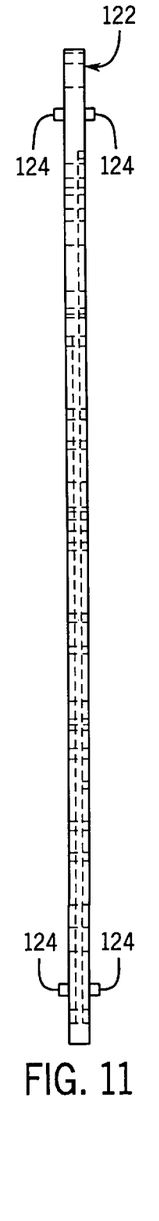
FIG. 11 is a side plan view of the gasket of FIG. 9.
Figure 12:
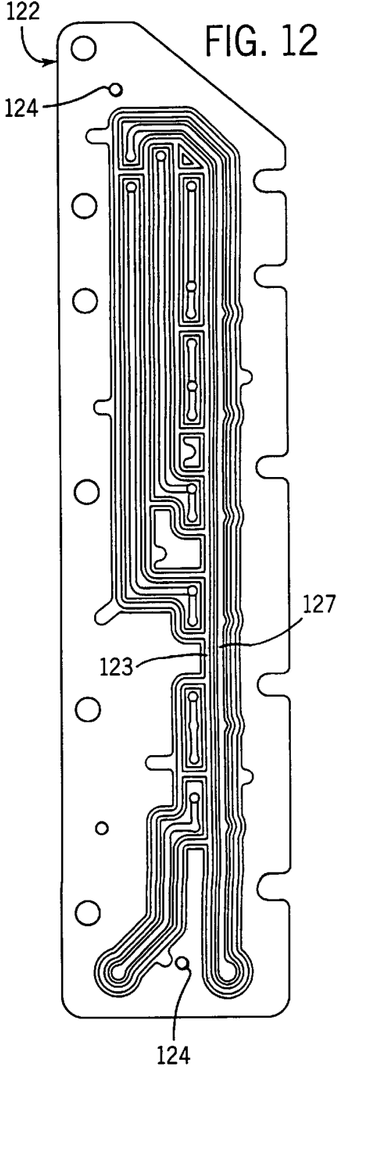
FIG. 12 is a side plan view of the side opposite from the side shown in FIG. 9 of the gasket.

The body 52 of each valve 46, comprised of the lower pole piece 72, the sleeve 70 and the upper pole piece 68, is held in the bore of the manifold 48 by a retainer plate 84. The retainer plate 84 has six bores 85 in it (FIGS. 5 and 6), one for each of the valves 46 of each valve bank, which are smaller in diameter than the outer diameter of the lower pole piece 72. The retainer plate 84 is bolted to the manifold 48 by flathead screws which extend through holes 86 in the retainer plate (FIGS. 5 and 6).

After the retainer plate 84 is bolted to the manifold 48, the six valve bodies extending from the manifold 48 are inserted into a coil pack assembly 88 which includes six electromagnetic coils 90 (wire wound on a bobbin 91), one for each valve 46, a printed circuit board 92 for making electrical connections 93 (FIG. 4) with each coil 90, and an L-shaped steel bracket 94 for completing the magnetic circuit between the upper and lower pole pieces 68 and 72. The coil pack assembly 88 is completed by over molding its components with an electrically insulating plastic resin to form body 96, which binds all of the components together in their assembled relationships.

Figure 13:
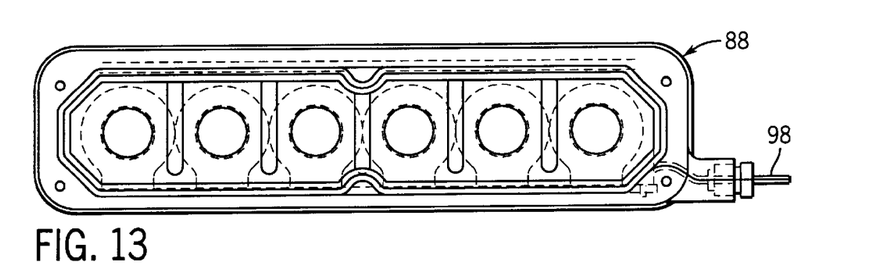
FIG. 13 is a top plan view of an overmold assembly for a valve bank of the LDU.
Figure 14:
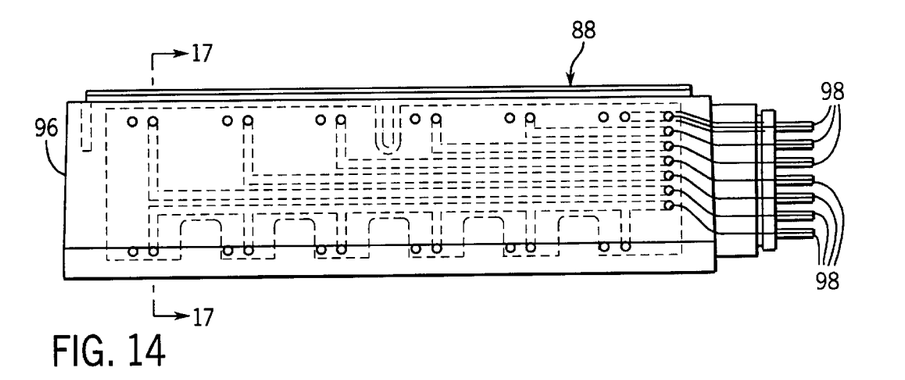
FIG. 14 is a side plan view of the overmold assembly.
Figure 15:
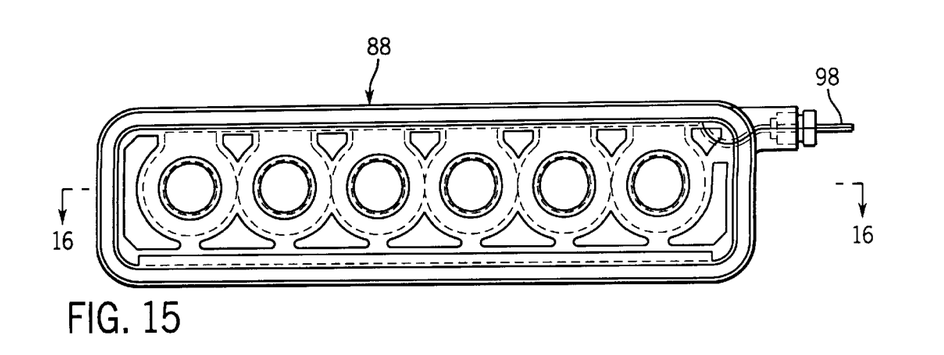
FIG. 15 is a bottom plan view of the overmold assembly.
Figure 16:
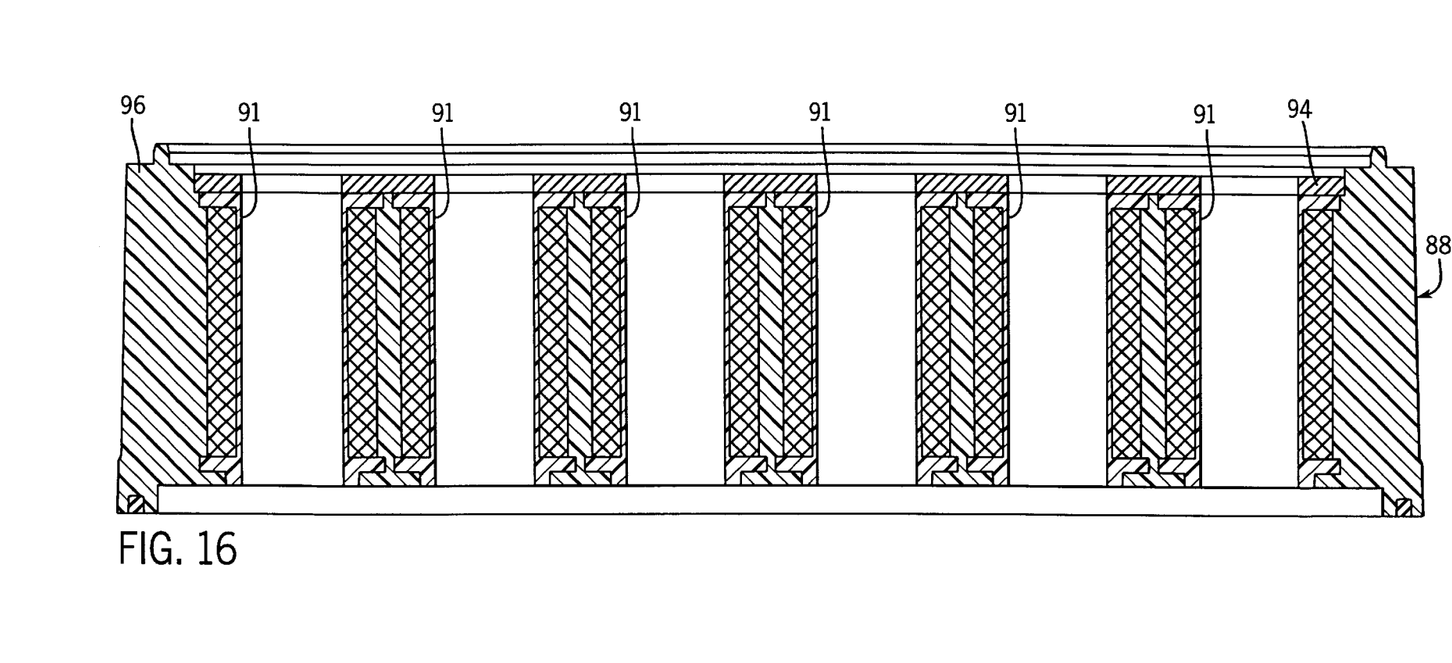
FIG. 16 is a cross-sectional view along the plane of the line 16—16 of FIG. 15.
Figure 17:
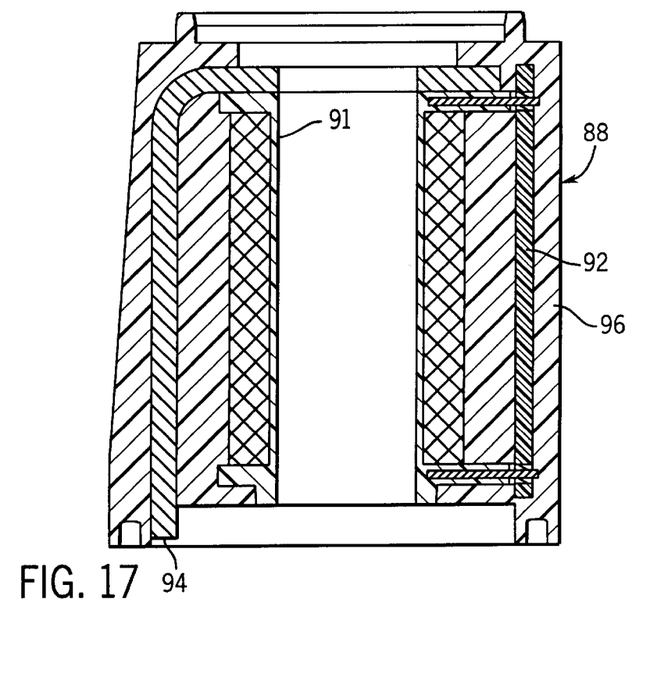
FIG. 17 is a cross-sectional view along the plane of the line 17—17 of FIG. 14.
Figure 18:
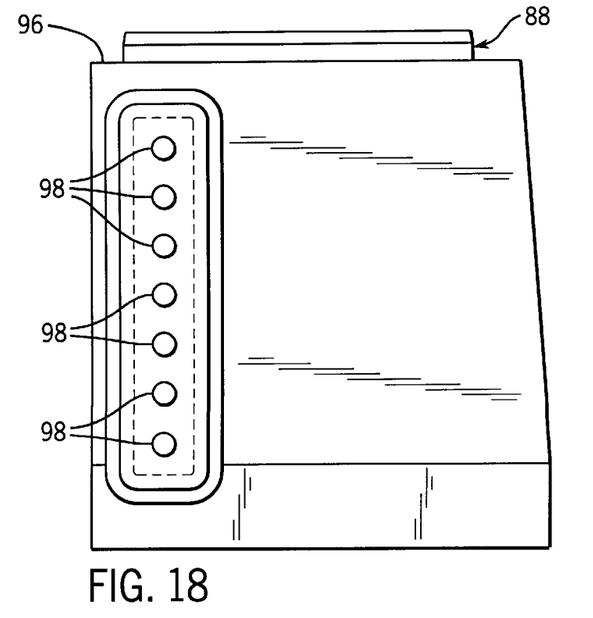
FIG. 18 is an end plan view of the overmold assembly.

Referring to FIGS. 13 and 14, electrical connector pins 98 extend from the coil pack assembly 88 for making electrical connections with the six coils 46 within the coil pack assembly. A total of seven pins are provided, which includes one ground pin for each solenoid and a single positive pin (the lowest pin 98 in FIG. 14) which is common to all six solenoid coils. The plastic resin body 96 provides a weatherproof, submersible and hermetically sealed circuit assembly for the electrical connections, circuit board and coils.

In the valve bank of FIGS. 3 and 4, the top or outer end of the upper pole piece 68 of each valve 46 is threaded and a nut 100 is threaded onto each pole piece 68 of the six valves 46 to hold the coil pack assembly 88 in place. The nuts 100 are steel and make physical contact with the L-shaped bracket 94 such that the magnetic circuit between the upper pole piece 68 and the lower pole piece 72 extends from the upper pole piece 68 through the nut 100 through the bracket 94 and from the bracket 94 through the retainer plate 84 and ultimately from the retainer plate 84 to the lower pole piece 72. The other side of the magnetic circuit is completed through the armature 64, which, of course, causes the armature 64 to be moved by energizing or de-energizing the coil 90.

Figure 2A:
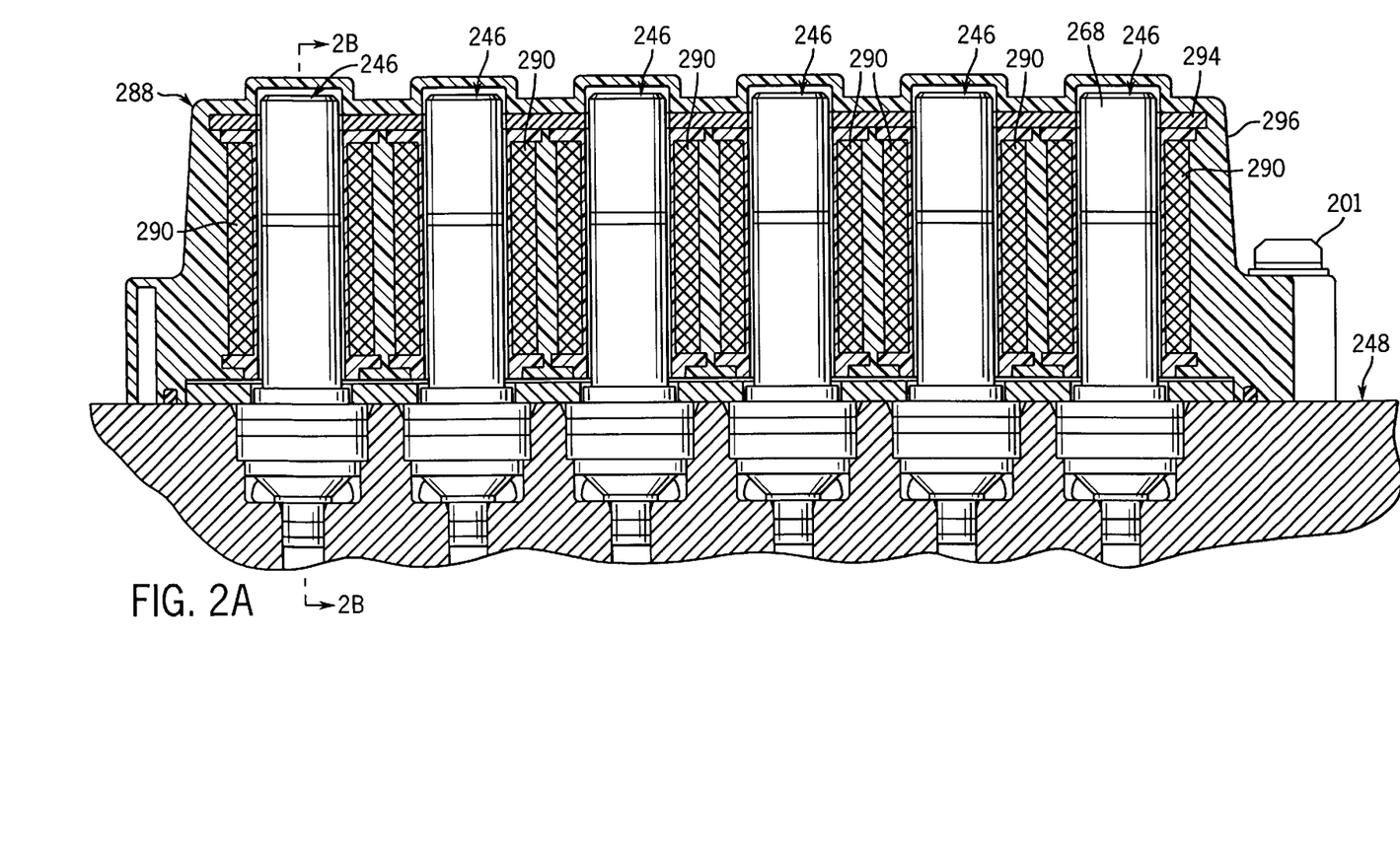
FIG. 2A is a cross-sectional view through a valve bank for the LDU illustrated in FIG. 1.
Figure 2B:
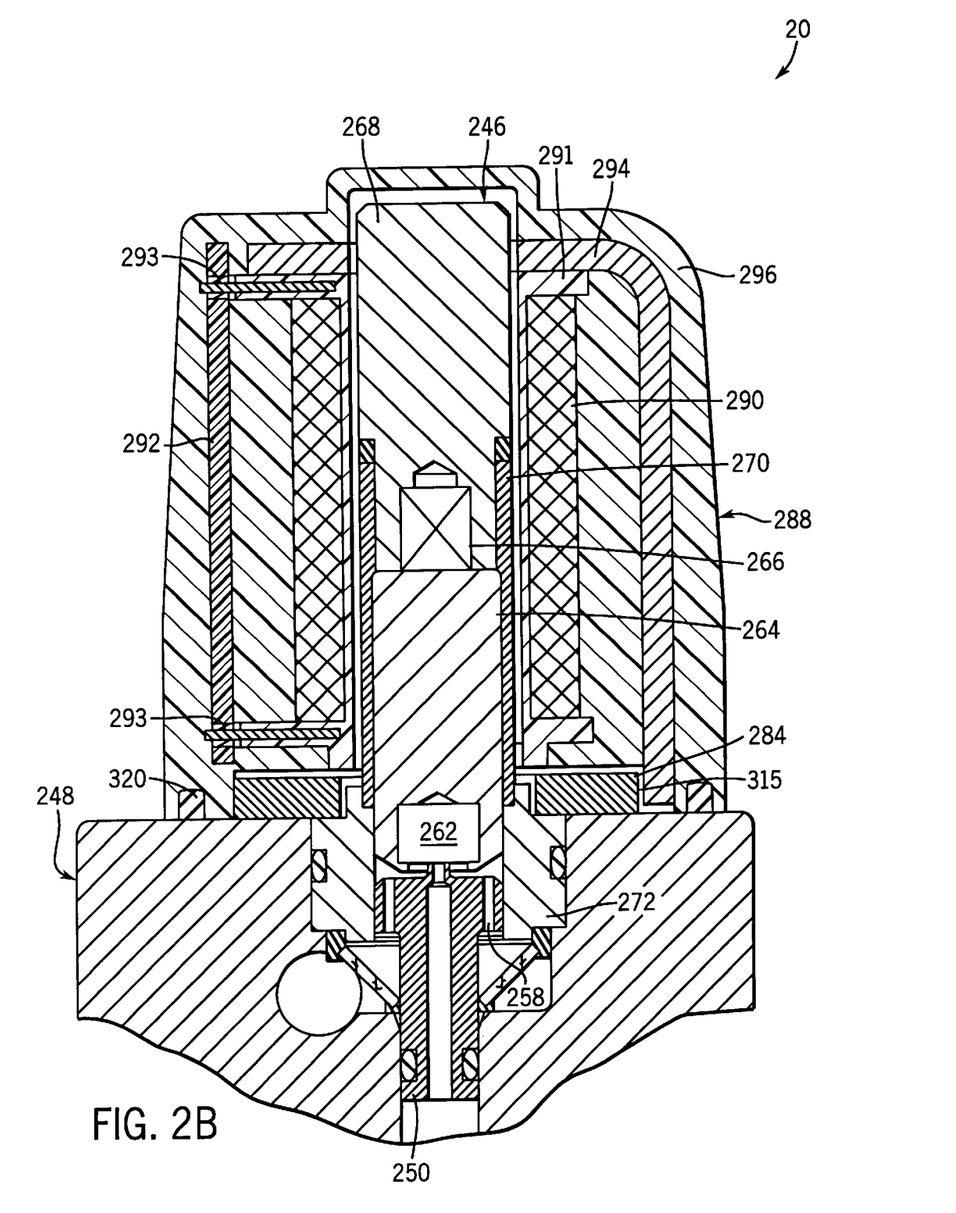
FIG. 2B is a cross-sectional view along the plane of the line 2B—2B of FIG. 2A.

In the alternate valve bank of FIGS. 2A and 2B, which has corresponding elements identified with the same reference number plus 200, substantially the only difference from the valve bank of FIGS. 3 and 4 is that the upper pole pieces 268 are not threaded and the nuts 100 are omitted. The coil pack assembly is the same, except that it is bolted onto the manifold using bolts at opposite ends, only one bolt being illustrated at 201 in FIG. 2A. In addition, the cover is molded as part of the body 296. Thus, it is not necessary to establish a flux path through continuous metal to metal contact between the bracket 294 and the upper pole piece 268, the flux path being able to bridge the small air gap from the pole piece 268 to the bracket 294.

Figure 19:
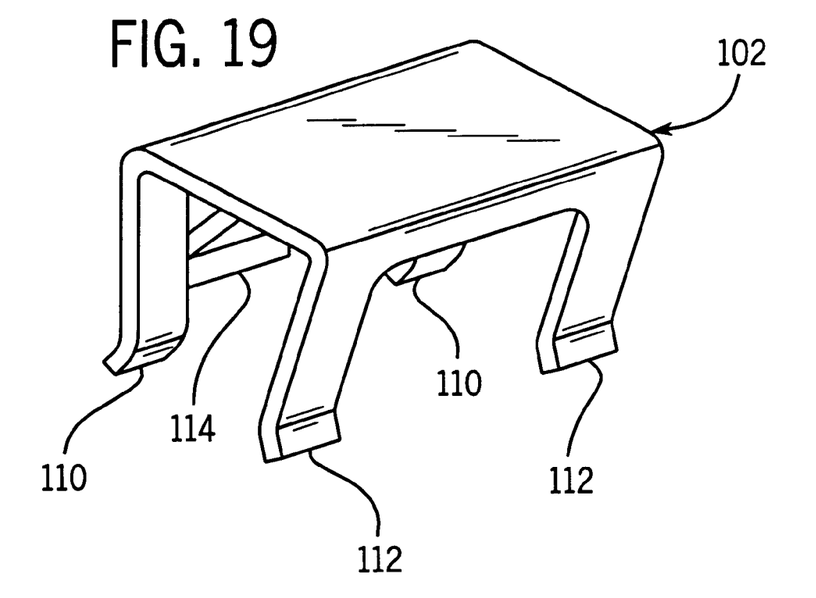
FIG. 19 is a perspective view of a spring clip for the valve bank assembly.
Figure 20:
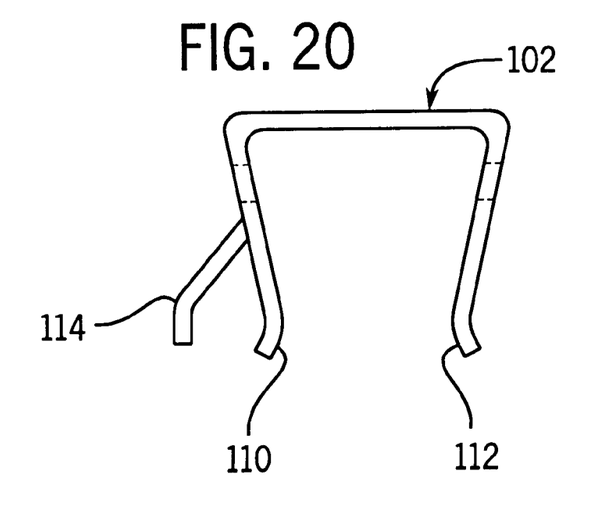
FIG. 20 is an end view of the spring clip of FIG. 19.

To ensure that intimate contact is made between the bracket 94 and the side of the retainer plate 84, two spring clips 102, one shown in FIGS. 19 and 20, may be clipped to the retainer plate 84 prior to assembling the coil pack assembly 88 over the valve bodies 52. The spring clips 102 are assembled to the retainer plate 84 so that the web of material 104 between each slot 106 and indent 108 of the retainer plate is received between the legs 110 and 112 of the spring clip 102, with spring leg 114 extending outwardly from the indent 108. Thus, when the coil pack assembly 88 is pushed down over the six valve bodies, the spring legs 114 push the coil pack assembly leftwardly as viewed in FIG. 4 (see dashed line representation of clip 102) and bias it into position so that the bracket 94 makes intimate contact with the side of the retainer plate 84 at the planar interface between them, identified by 115 in FIG. 4. Here also, actual metal to metal contact is not absolutely needed, as the magnetic flux is able to bridge a small air gap as shown in FIG. 2B.

A cover 116 is provided over the top of the coil pack assembly 88 and secured by a snap fit or other suitable means, with a seal ring 118 to seal dirt and other particles from reaching the inside of the coil pack assembly 88. Coil pack assembly 88 also has a seal ring 120 at its lower end, which seals against the manifold 48 for the same purpose.

As stated above, the manifolds of the relief valve bank and of the supply valve bank are essentially identical, although the location of bores for making hydraulic connections or for mounting an accumulator may differ. The two manifolds are bolted together with a gasket 122 in between of the type illustrated in FIGS. 9–12. The gasket 122 is a rigid plastic gasket which has sealing rings (e.g., 123) molded into its opposite sides which seal off flow passageways (e.g., 125 and 127) which are molded into the opposite sides of the gasket. Such gaskets are known, and are commercially available from Fel-Pro Incorporated of Skokie, Ill. The gasket 122 may be provided with locating pins 124 for locating the gasket relative to the two manifolds which sandwich it, and the bulk of the manifolds and the fact that they are securely bolted together permits the gasket 122 to be used in relatively high-pressure applications. For higher pressures, it may be necessary to provide the gasket with two or more sealing beads of elastomer on each side of the passageways formed in the gasket, to seal the two manifolds by a different means, or to form the two manifolds as a single manifold, for example as an extruded aluminum bar.

Preferred embodiments of a valve coil pack of the invention have been described in considerable detail. Modifications and variations of those embodiments will be apparent to those skilled in the art. Therefore, the invention should not be limited to the embodiments described, but should be defined by the claims which follow.

I claim:

1. In a solenoid operated valve bank having multiple solenoid coil operated valves arranged in a manifold, each said valve having an upper pole piece extending outwardly of said manifold and a lower pole piece within said manifold, each of said valves having a separately actuable coil for actuating said valve when a voltage is applied to said coil, the improvement wherein said coils are bound to one another in a coil pack by a common body and said body binds a bracket to said coils which is common to said coils and made of a magnetic material, said bracket having an L-shaped cross-section and extending from adjacent to said upper pole pieces of said valves at one end of said L-shape, laterally along one end of said coils to a position alongside said coils, and then parallel to an axial direction of said coils alongside of said coils to an opposite end of said L-shape which is adjacent to said manifold.

2. The improvement of claim 1, wherein at said one end, said upper pole pieces extend through said one end of said bracket.

3. The improvement of claim 1, wherein a plate made of a magnetic material extends from adjacent said opposite end of said bracket to adjacent to said lower pole pieces of said valves.

4. The improvement of claim 3, wherein said plate is a retainer plate which fixes said valves in said manifold.

5. The improvement of claim 3, wherein said valves extend through said plate.

6. The improvement of claim 3, wherein a clip extends between a side of said body opposite from said opposite end of said bracket and a side of said plate opposite from said opposite end of said bracket.

7. The improvement of claim 1, wherein a nut made of a magnetic material is threaded onto said upper pole piece and makes contact with said one end of said bracket.

8. The improvement of claim 1, wherein said body is a solid resin mass which fills spaces between said coils.

9. The improvement of claim 1, wherein said body binds electrical circuitry to said coils, said circuitry being electrically connected to said coils so as to individually actuate said coils.

10. The improvement of claim 9, wherein said body is a plastic resin which encases said circuitry so as to be weatherproof, submersible and hermetically sealed.

11. The improvement of claim 1, wherein said coil pack is part of a load distribution unit of a vehicle suspension system.

* * * * *